(12) United States Patent
Nuzzi et al.

(10) Patent No.: US 8,595,108 B2
(45) Date of Patent: Nov. 26, 2013

(54) CONTINGENT PAYMENT SYSTEM

(75) Inventors: Frank Anthony Nuzzi, Pflugerville, TX (US); James Brett Sowder, Austin, TX (US)

(73) Assignee: Ebay Inc., San Jose, CA (US)

( * ) Notice: Subject to any disclaimer, the term of this patent is extended or adjusted under 35 U.S.C. 154(b) by 0 days.

(21) Appl. No.: 13/427,483

(22) Filed: Mar. 22, 2012

(65) Prior Publication Data

US 2013/0253998 A1  Sep. 26, 2013

(51) Int. Cl.
*G06Q 40/00* (2012.01)

(52) U.S. Cl.
USPC ............................................. 705/35; 705/40

(58) Field of Classification Search
USPC ..................................... 705/35, 40
See application file for complete search history.

(56) References Cited

U.S. PATENT DOCUMENTS

| 7,769,633 B2 * | 8/2010 | Jokinen et al. ............. 705/14.4 |
| 2006/0085259 A1 * | 4/2006 | Nicholas et al. ............. 705/14 |
| 2006/0271462 A1 * | 11/2006 | Harmon ..................... 705/35 |

OTHER PUBLICATIONS

Shidlovski, Eldad; "Four Essays on Wage Indexation"; New York University; UMI Dissertations Publishing; 1982.*
Campbell, Donald J. "The effects of Goal-Contingent Payment on the Performance of a Complex Task"; Personnel Psychology; 1984.*

* cited by examiner

*Primary Examiner* — Edward Chang
(74) *Attorney, Agent, or Firm* — Haynes and Boone, LLP

(57) ABSTRACT

A method for providing contingent payments includes receiving, from a first user through a user device over a network, a contingent payment request. The contingent payment request is stored in a database. A contingent payment intent is provided on a user profile that is associated with the first user. The user profile is monitored. When it is determined that at least one contingent payment factor in the contingent payment request has been satisfied by a second user, funds are transferred from a user account associated with the first user to a merchant account in order to purchase a first product that is associated with the contingent payment request. In an embodiment, the second user may provide a coupon on the user profile that satisfies the at least one contingent payment factor and results in the purchase of the first product using the user account.

20 Claims, 11 Drawing Sheets

CONTINGENT PAYMENT SYSTEM

BACKGROUND

1. Field of the Invention

The present invention generally relates to online and/or mobile payments and more particularly to a contingent payment system.

2. Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why online and mobile purchases are growing very quickly.

Conventionally, payers making purchases using online payment systems have been required to search for the product they wish to purchase and, upon finding that product at a price are willing to pay, complete the purchase of the product at that price immediately. However, some payers may only wish to make certain purchases based upon a number of factors that may or may not occur in the future. For example, a payer may want to purchase a product, but the payer may not be willing to purchase that product at the price that product is currently being offered, may not wish to purchase that product for a certain amount of time, may only want to purchase that product in response to a particular outcome of an event occurring, combinations thereof, and/or a variety of other contingencies know in the art. Traditionally, such payers must personally monitor the factors that figure into their decision for making a purchase in order to attempt to complete the purchase according to their desires. Making purchases in such a manner can be so time-consuming for the payer that, in many situations, the desired purchase may simply not be possible, resulting in dissatisfied payers and lost sales for merchants.

Thus, there is a need for an improved online payment system that provides for contingent payments.

SUMMARY

According to one embodiment, a method for providing a contingent payment includes receiving contingent payment request from a user and, in response, providing an associated contingent payment intent on a user profile of the user. The user profile is then monitored to determine whether at least one contingent payment factor associated with the contingent payment request is satisfied. When the at least one contingent payment factor is satisfied, funds are transferred from a user account of the user to purchase a product that is associated with the contingent payment request.

In an embodiment, a user may wish to purchase a product in the event that one or more contingent payment factors occur. Contingent payment factors may include a price at which the product may be purchased being at most a desired price, a predetermined event occurring, another product being purchased, etc. The user provides the one or more contingent payment factors in a contingent payment request, which is stored in a database. An associated contingent payment intent is provided on a user profile of the user that includes an indication that the user wishes to purchase the product and may include some or all of the contingent payment factors. The user profile is monitored to determine whether a coupon is provided on the user profile that allows the product to be purchased at or below the desired price. In addition, the product may be monitored to determine whether the price drops to at most the desired price, and events included in the contingent payment factors may be monitored to determine whether they occur. When one or more of the contingent payment factors are satisfied, the product will be purchased automatically for the user using a user account associated with the user.

As a result, a user may create contingent payment requests that are carried out automatically based on one or more contingent payment factors being satisfied. This may be particularly useful when the user is willing to wait to purchase the product in order to be able to purchase the product at a better price, and/or purchase the product in response to a particular event or the purchase of another product.

These and other features and advantages of the present disclosure will be more readily apparent from the detailed description of the embodiments set forth below taken in conjunction with the accompanying figures.

Figure 1:
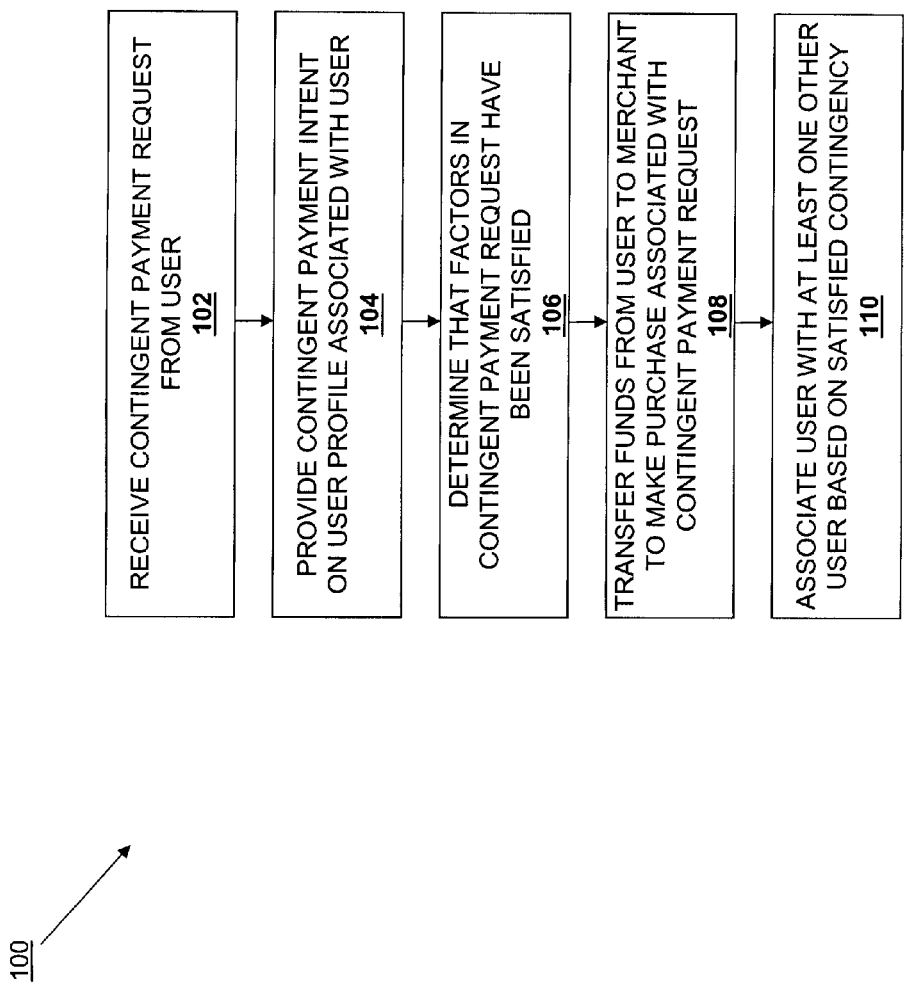
FIG. 1 is a flow chart illustrating an embodiment of a method for providing a contingent payment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a system and method for providing contingent payments. A user provides a contingent payment request associated with a product and including one or more contingent payment factors. The contingent payment request is stored in a database, and the receipt of the contingent payment request causes a contingent payment intent to be provided on a user profile associated with the user. The user profile is monitored to determine whether any or all of the one or more contingent payment factors associated with the contingent payment request are satisfied, and, if so, funds are transferred from the user account to purchase the product. The system and method allow a user to have a product purchased for them automatically in response to the product becoming available for a desired price, a particular event occurring, an associated product being purchased, a variety of other contingent payment factors, and/or combinations thereof.

Figure 2:
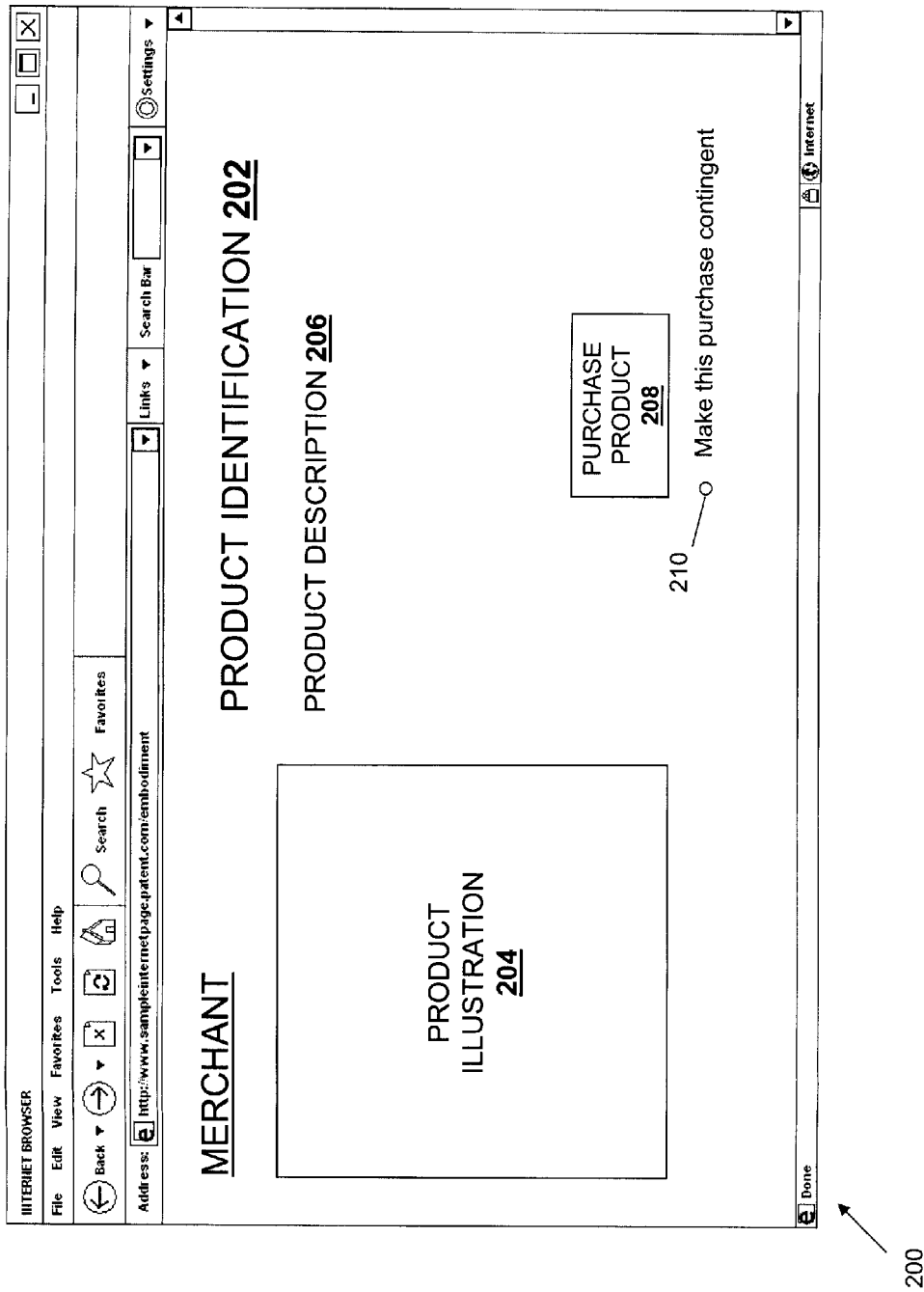
FIG. 2 is a screenshot view illustrating an embodiment of a product web page.

Referring now to FIGS. 1 and 2, a method 100 for providing contingent payments is illustrated. In the embodiment of the method 100 described below, an account provider provides an user with a user account, and the user may use the user account to fund payments for purchases made from merchants. In another embodiment, a payment service provider such as, for example, PayPal, Inc. of San Jose, Calif. assists in the making of payments from the user to the merchant by transferring funds from the user account to a merchant account of the merchant. However, these embodiments are meant to be merely exemplary, and one of skill in the art will recognize that a variety of modifications may be made to the contingent payment system discussed herein without departing from the scope of the present disclosure. Furthermore, one of skill in the art will recognize that any of the merchant, payment service provider, and/or the account provider may provide for the contingent payments from the user account as is discussed below.

The method 100 begins at block 102 where a contingent payment request is received from a user. In an embodiment, a user having a user device may access a product page 200 (as shown in FIG. 2) over a network (e.g., the Internet) by connecting to an merchant device of the merchant. As is known in the art, the merchant may use a merchant device (and/or a third party device) to provide a website having a plurality of web pages that are similar to the product page 200 in order to allow users to purchase products over the network. In the illustrated embodiment, the product page 200 includes a product identification 202, a product illustration 204, a product description 206, and a purchase product button 208. The product page 200 also includes a contingent purchase selector 210 that the user may select in order to provide a contingent payment request for the product associated with the product page 200. At block 102, the user selects the contingent payment selector 210 and then selects the purchase product button 208 in order to being the provision of a contingent payment request.

Figure 3:
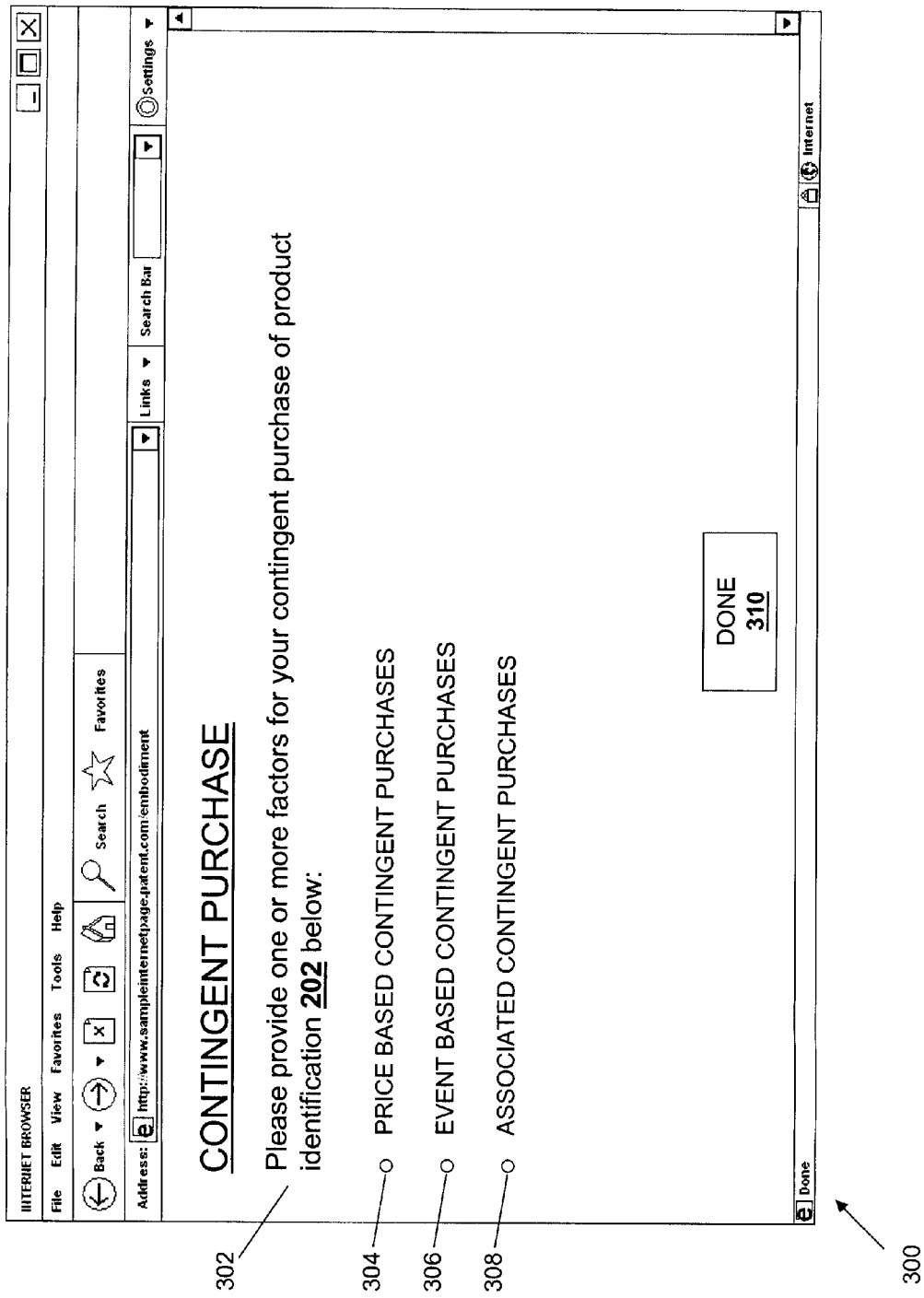
FIG. 3 is a screenshot view illustrating an embodiment of a contingent purchase request web page.

Referring now to FIG. 3, upon selection of the contingent payment selector 210 and the purchase product button 208 by the user, the user device is provided with a first contingent payment request web page 300 by the contingent payment system provider device over the network. In some embodiments, the contingent payment system is provided by the merchant, and the merchant device provides the contingent payment request web pages discussed herein to the user device over the network. In some embodiments, the contingent payment system is provided by the payment service provider, and the payment service provider device provides the contingent payment request web pages discussed herein to the user device over the network (e.g., selection of the contingent payment selector 210 and the purchase product button 208 transfers the connection of the user device from the merchant device to the payment service provider device). In some embodiments, the contingent payment system is provided by the account provider, and the account provider device provides the contingent payment request web pages discussed herein to the user device over the network (e.g., selection of the contingent payment selector 210 and the purchase product button 208 transfers the connection of the user device from the merchant device to the account provider device). Thus, in the description below, the contingent payment system provider and associated contingent payment system provider device may refer to any of the above entities and their devices, along with a variety of other entities known in the art.

The first contingent payment request web page 300 includes an instruction 302 to provide one or more contingent payment factors for the contingent payment request for the product associated with the product identification 202, along with a price-based contingent payment factor selector 304, an event-based contingent payment factor selector 306, and an associated-purchases-based contingent payment factor selector 308. The first contingent payment request web page 300 also includes a done button 310 that allows the user to indicate that all the desired contingent payment factors have been provided for the contingent payment request. While in the embodiment illustrated and described below, the contingent payment factors include price-based, event-based, and associated-purchase-based factors, one of skill in the art will recognize that a variety of other contingent payment factors will fall within the scope of the present disclosure.

Figure 4:
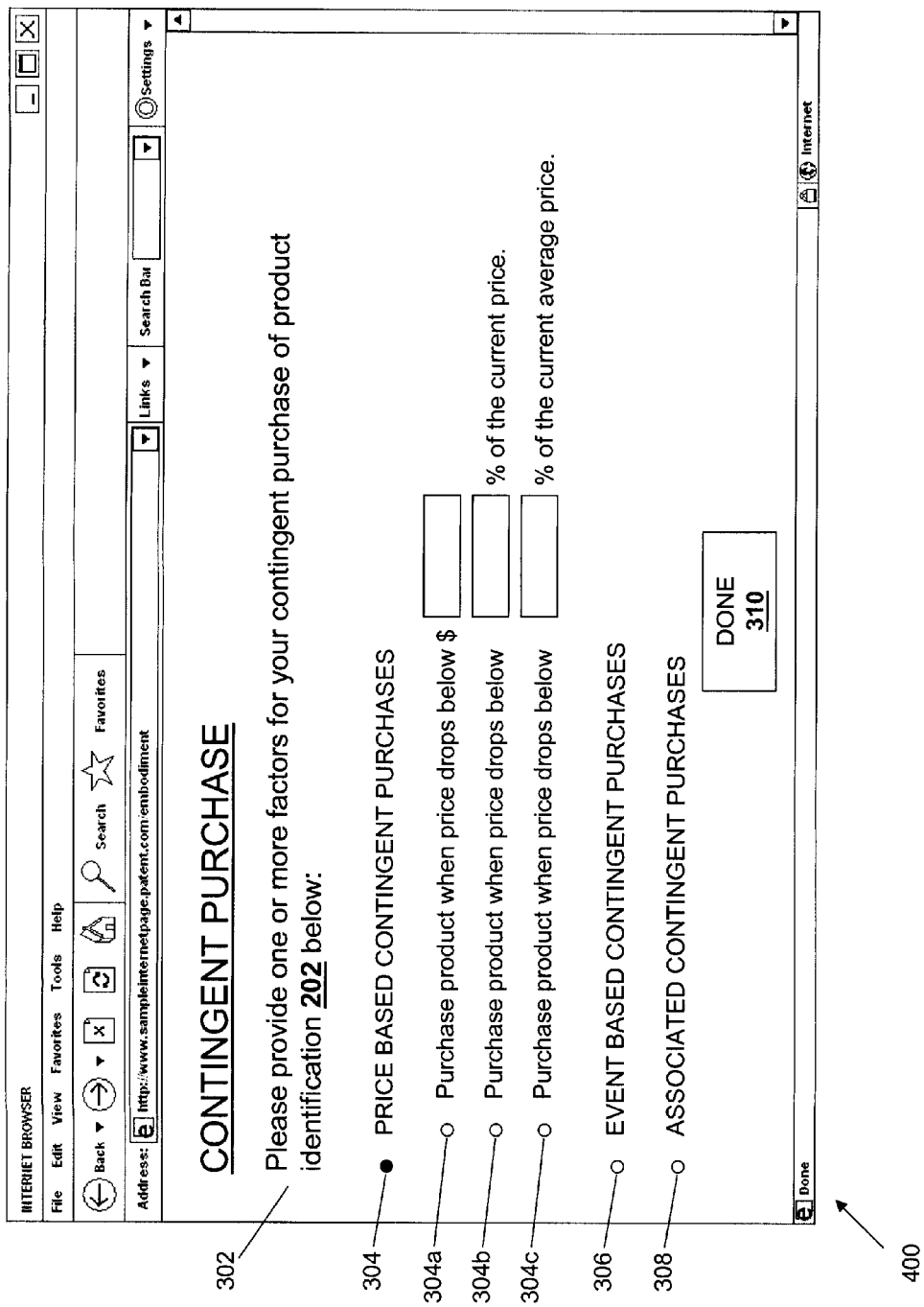
FIG. 4 is a screenshot view illustrating an embodiment of a contingent purchase request web page.

Referring now to FIG. 4, in response to the user selecting the price-based contingent payment factor selector 304, a second contingent payment request web page 400 is provided by the contingent payment system provider device to the user device over the network. The second contingent payment request web page 400 includes the instruction 302, the price-based contingent payment factor selector 304, the event-based contingent payment factor selector 306, the associated purchases-based contingent payment factor selector 308, and the done button 310, described above with reference to FIG. 3. However, in response to the user selection of the price-based contingent payment factor selector 304, a plurality of contingent factor details 304a, 304b, and 304c are provided. The contingent factor detail 304a allows the user to provide a desired price at or below which the user wishes to purchase the product. The contingent factor detail 304b allows the user to provide a desired percentage of the current price at or below which the user wishes to purchase the product. In some embodiments, a current price of the product may be retrieved (e.g., from the product web page 200, after a search for the prices of the product from a plurality of merchants to determine the lowest current price, etc.) and displayed adjacent the contingent factor detail 304b. The contingent factor detail 304c allows the user to provide a desired percentage of the average price at or below which the user wishes to purchase the product. In some embodiments, an average price of the product may be retrieved (e.g., after a search for the prices of the product from a plurality of merchants, which may then be used to calculate an average price) and displayed adjacent the contingent factor detail 304c. While a plurality contingent factor details associated with the price-based contingent payment factor selector 304 have been illustrated and described, one of skill in the art will recognize that a variety of contingent factor details for a price-based contingent payment factor will fall within the scope of the present disclosure.

Figure 5:
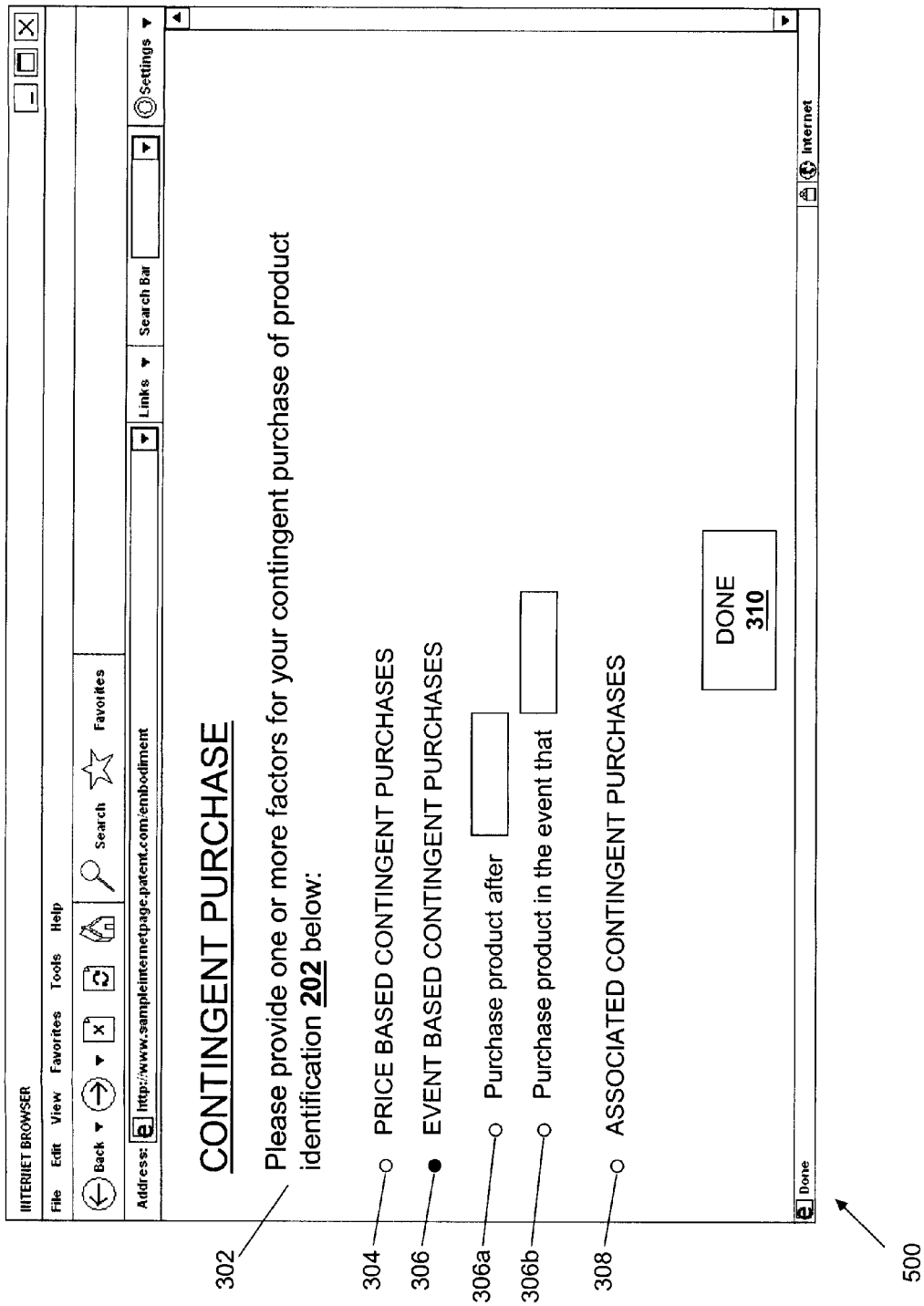
FIG. 5 is a screenshot view illustrating an embodiment of a contingent purchase request web page.

Referring now to FIG. 5, in response to the user selecting the event-based contingent payment factor selector 306, a third contingent payment request web page 500 is provided by the contingent payment system provider device to the user device over the network. The third contingent payment request web page 400 includes the instruction 302, the price-based contingent payment factor selector 304, the event-based contingent payment factor selector 306, the associated purchases-based contingent payment factor selector 308, and the done button 310, described above with reference to FIG. 3. However, in response to the user selection of the event-based contingent payment factor selector 306, a plurality of contingent factor details 306a and 304b are provided. The contingent factor detail 306a allows the user to provide a date at or after which the user wishes to purchase the product. The contingent factor detail 306b allows the user to provide an event which, upon the occurrence of the event, the user wishes to purchase the product. While a plurality contingent factor details associated with the event-based contingent payment factor selector 306 have been illustrated and described, one of skill in the art will recognize that a variety of contingent factor details for an event-based contingent payment factor will fall within the scope of the present disclosure.

Figure 6:
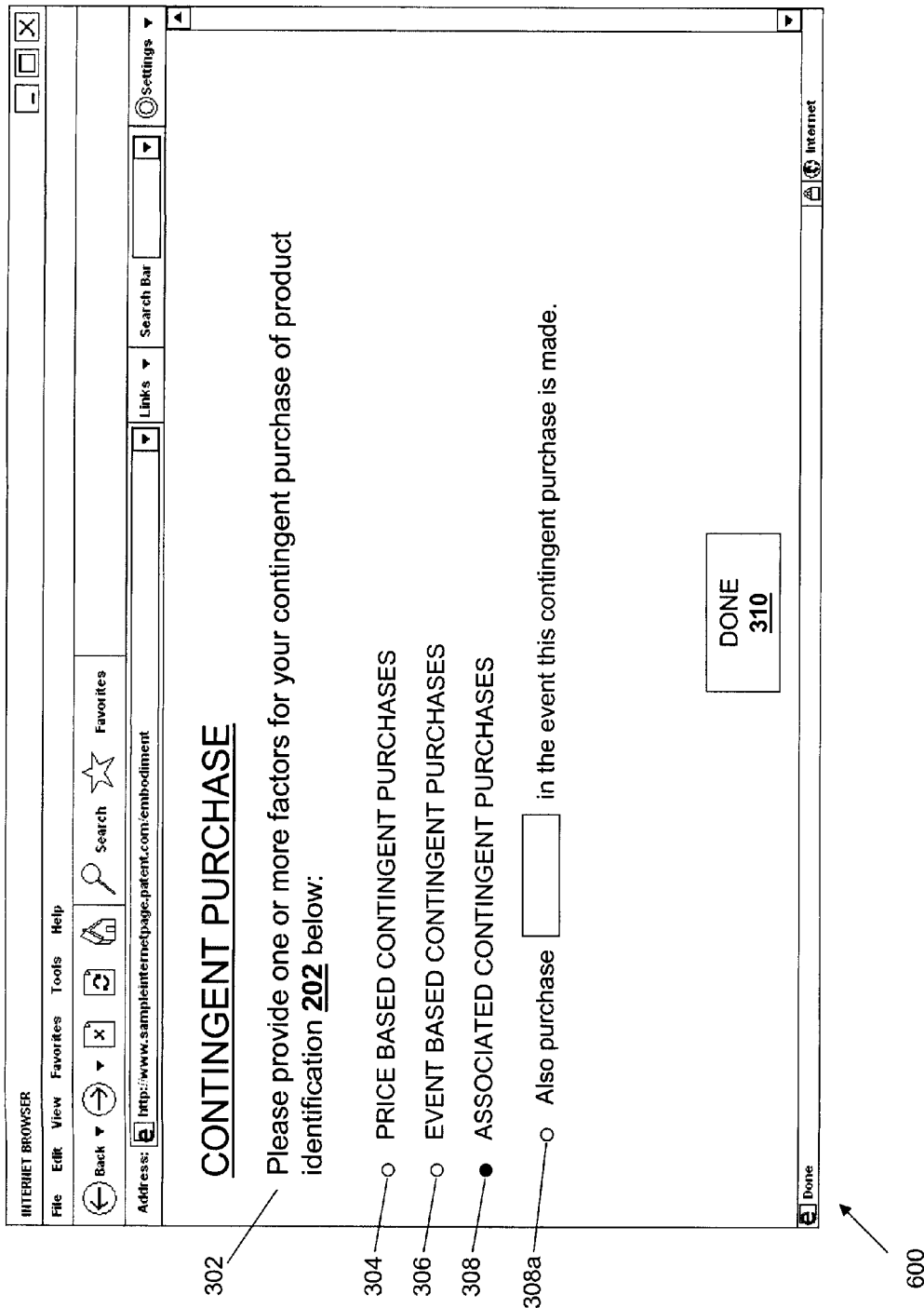
FIG. 6 is a screenshot view illustrating an embodiment of a contingent purchase request web page.

Referring now to FIG. 6, in response to the user selecting the associated-purchase-based contingent payment factor selector 308, a fourth contingent payment request web page 600 is provided by the contingent payment system provider device to the user device over the network. The fourth contingent payment request web page 600 includes the instruction 302, the price-based contingent payment factor selector 304, the event-based contingent payment factor selector 306, the associated purchases-based contingent payment factor selector 308, and the done button 310, described above with reference to FIG. 3. However, in response to the user selection of the associated-purchase-based contingent payment factor selector 308, a contingent factor detail 308a is provided. The contingent factor detail 308a allows the user to provide a product which the user wishes to purchase if the product for which the contingent purchase request is being made is purchased. While the contingent factor detail 308a is illustrated and described as allowing a user to purchase a second product in response to a contingent purchase request of a first product being executed, other embodiments may include a contingent product request that request the purchase of a product in response to the detection of the purchase of another product. For example, the product web page 200 may be associated with a product (e.g., nails) that the user only wishes to purchase in the event the user purchases another product (e.g., a hammer), and the contingent factor detail 308a may allow the user to set up a contingent payment request that will cause the contingent payment system provider device to monitor of all purchases by the user until the associated product is purchased, resulting in the purchase of the contingent product, discussed in further detail below. While a contingent factor detail associated with the associated-product-based contingent payment factor selector 308 has been illustrated and described, one of skill in the art will recognize that a variety of contingent factor details for an associated-product-based contingent payment factor will fall within the scope of the present disclosure.

Figure 7:
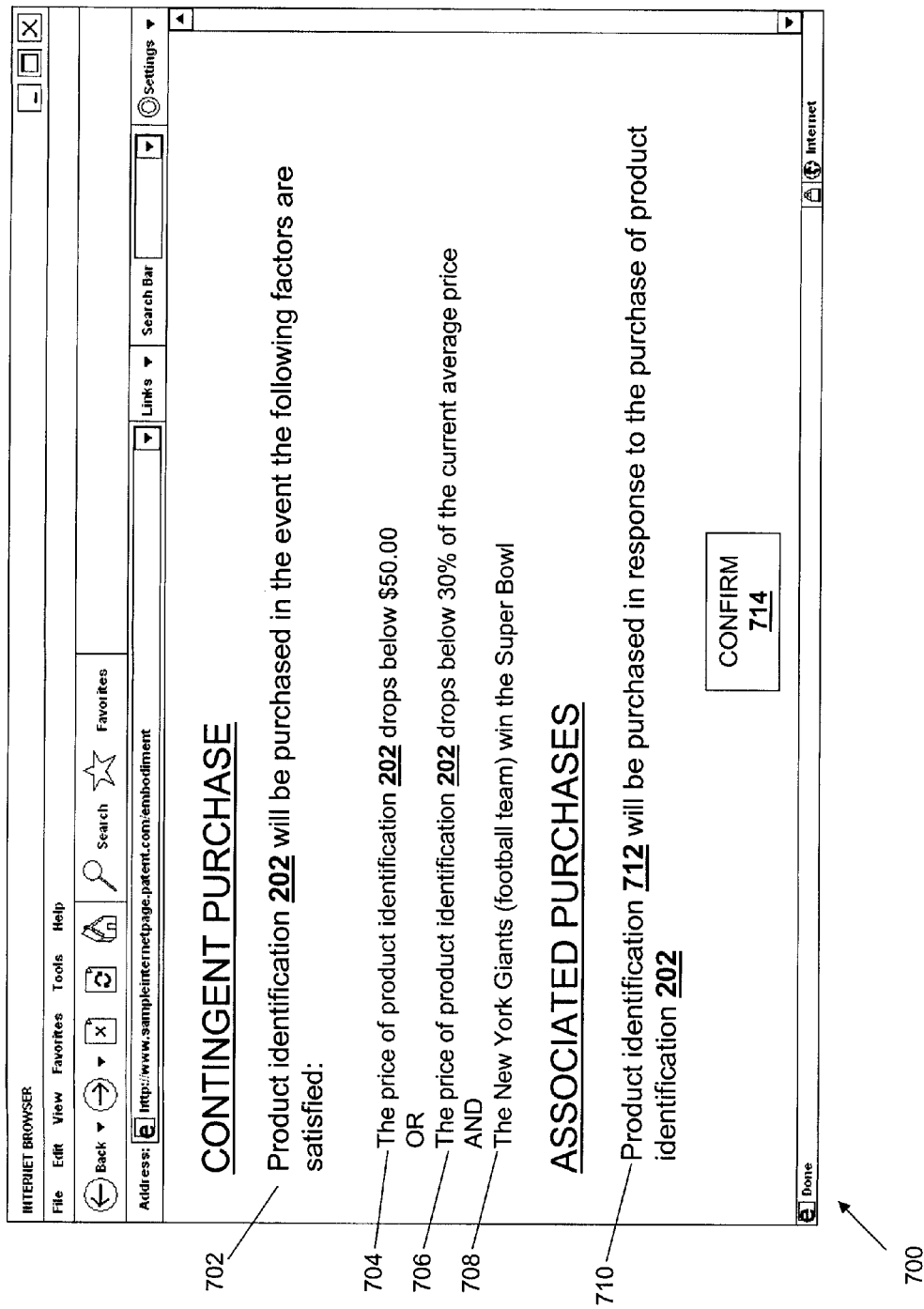
FIG. 7 is a screenshot view illustrating an embodiment of a confirmation web page.

Referring now to FIG. 7, in response to the user selecting the done button 310 on any of the second contingent payment request web page 400, the third contingent payment request web page 500, and the fourth contingent payment request web page 600 after providing at least one contingent payment detail for a contingent payment factor, a confirmation web page 700 is provided by the contingent payment system provider device to the user device over the network. The confirmation web page 700 includes a confirmation 702 that the product associated with the product identification 202 will be purchased in response to the satisfaction of a plurality of contingent payment factors 704, 706, and 708.

In the illustrated embodiment, the user has provided the contingent payment factors 704, 706, and 708 to request that the product be purchased if either the price of the product associated with the product identification 202 drops below $50 or drops below 30% of its current average price, and if the New York Giants football team win the Super Bowl. In an embodiment, the logical operators used with the contingent payment factors may be assumed by the contingent payment system (e.g., multiple selection of contingent payment details for a particular contingent payment factor may result in a logical OR operator, as illustrated) and/or provided by the user (e.g., contingent payment details for different contingent payment factors may require the selection of a logical operator such as the AND operator in the illustrated embodiment, or may be automatically provided as a default that may then be modified by the user.) In the illustrated embodiment, the user has also provided the contingent payment factors 710 to request that a product associated with an identification 712 be purchased in response to the purchase of the product associated with the product identification 202 (e.g., the product for which the contingent purchase is being made in the illustrated embodiment.) The confirmation web page 700 includes a confirm button 714 that the user may select if the information displayed on the confirmation web page 700 is correct, which will result in the submission of the contingent payment request from the user device to the contingent payment system provider device over the network. In response to the user selecting the confirm button 714 on the confirmation web page 700, the contingent payment system provider device may associate the contingent payment request with the user and store the contingent payment request in a database.

Figure 8:
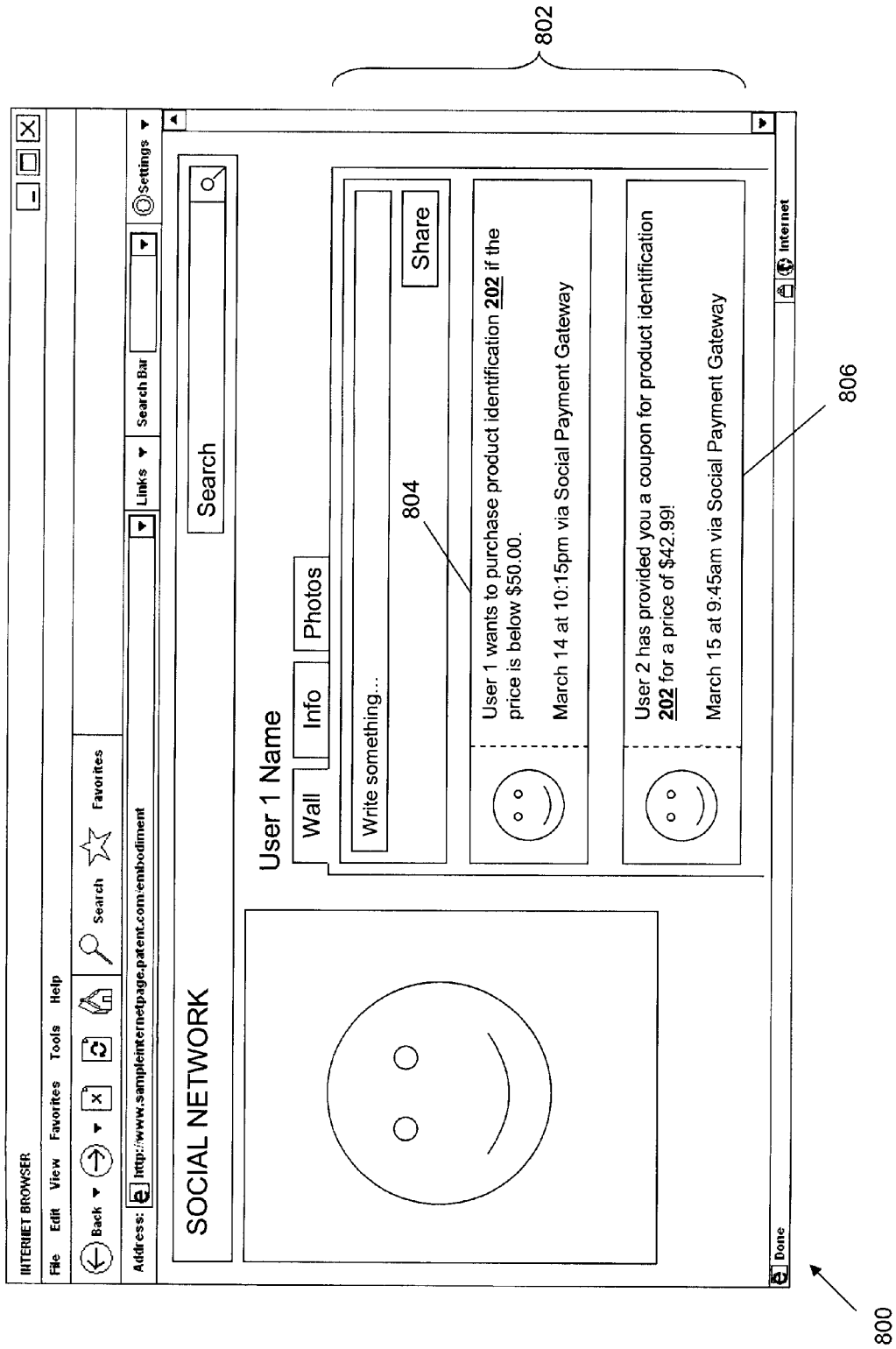
FIG. 8 is a screenshot view illustrating an embodiment of a user profile web page.

Referring now to FIGS. 1 and 8, the method 100 proceeds to block 104 where a contingent payment intent is provided on a user profile associated with the user. FIG. 8 illustrates a user profile web page 800. In an embodiment, the user profile web page 800 is provided for the user by a social network provider device over a network. As is know in the art, the social network provider device provides user profiles for a plurality of users and allows the plurality of users to comment, submit content, and otherwise "post" information to each others user profiles. The user provide web page 800 includes a posting section 802 (e.g., a "wall"). At block 104 of the method 100, in response to receiving the contingent payment request from the user in block 102 of the method 100, the contingent payment system provider device provides a contingent payment intent 804 on the user profile. For example, the contingent payment system provider device may send the contingent payment intent over the network to the social network provider device, and the social network provider device will then provide the continent payment intent in the posting section 802 of the user profile web page 800. In an embodiment, a link between the contingent payment system provider device and the social network provider device may cause the automatic provision of the contingent payment intent 804 on the user provider webpage 800. As can be seen in the illustrated embodiment, the contingent payment intent 804 indicates that the user associated with the user profile web page 800 wishes to purchase the product associated with the product identification 202 if the price of the product is below $50. While a single contingent payment factor is illustrated as being provided in the contingent payment intent, any or all of the contingent payment factors provided by the user in the method 100 may be included in the contingent payment intent 804. Furthermore, web links to the product associated with the product identification 202 may be provided as well.

While a contingent payment intent 804 is illustrated and described as being provided on the user profile web page 800, the contingent payment intent 804 may be provided on a group or other profile without departing from the scope of the present disclosure. For example, a group of users may share a group profile and contingent payment requests from any of those users may result in contingent payment intents to be provided on the group profile in substantially the same manner as described above for the user profile.

The method 100 then proceeds to block 106 where it is determined that contingent payment factors in the contingent payment request have been satisfied. In an embodiment, the contingent payment system provider may monitor the user profile 800, the product web page 200, a plurality of merchant websites that include web pages selling the product associated with the product identification 202, news websites, a calendar, and/or a variety of other information sources known in the art to determine whether the contingent payment factors associated with the contingent payment request received in block 102 of the method 100 have been satisfied. A number of examples will now be provided to illustrate the monitoring of contingent payments factors in different embodiments of the method 100.

In one example, the contingent payment system provider device may monitor the user profile over the network through the social network provider device and determine whether another user (i.e., a user other than the user associated with the user profile web page 800) has provided a response to the contingent payment intent 804 that satisfies the contingent payment factors in the contingent payment request. The user profile web page 800, illustrated in FIG. 8, includes a contingent payment intent response 806 provided by a user other than the user associated with the user profile web page 800 (e.g., a "friend user" of the user associated with the user profile web page 800). In an embodiment, the contingent payment intent response 806 is not provided by a merchant (e.g., it is provided by a friend user of the user that is a person rather than a business selling the product). In the embodiment illustrated in FIG. 8, the user associated with the user profile web page 800 has set up a contingent payment request according to the method 100 that includes a request to purchase a product associated with the product identifier 202 if the price of that product is below $50.00, and the friend user has provided the contingent payment intent response 806 that includes a coupon to buy the product for $42.99 (e.g., a coupon code, a web link to a coupon, etc.). At block 106 of the method 100, the contingent payment system provider device monitors the user profile web page 800 (over the network through the social network provider device) for the posting of contingent payment intent responses to determine if any satisfy the contingent payment factors in the content payment request. Thus, at block 106 in the embodiment illustrated in FIG. 8, the contingent payment system provider device will detect the posting of the contingent payment intent response 806 and determine that it satisfies the contingent payment factor (i.e., the price of the product associated with the product identifier 202 being below $50). Detection of a satisfied contingent payment factor may include the contingent payment system provider device confirming the validity of and pricing savings associated with a coupon (e.g., by contacting the merchant device of the merchant that issued the coupon over the network.)

In another example, the user associated with the user profile web page 800 may have set up a contingent payment request according to the method 100 that includes a request to purchase a product (e.g., a shirt) if the price of that product is below 50% of the average price of the product and the New York Giants football team wins the Super Bowl. In some embodiments, that contingent payment request may result in a contingent payment intent being posted to the user profile web page 800 that includes some or all of the contingent payment factors associated with the contingent payment request (e.g., "User 1 wants to purchase product X if the New York Giants win the Super Bowl and the price is discounted 50%"). At block 106, the contingent payment system provider device may monitor news websites, sports websites, and other information sources to determine whether the New York Giants football team win the Super Bowl. In response to the determining that the New York Giants football team has won the Super Bowl, the contingent payment system provider device may retrieve the prices (e.g., "retail" prices) for the product from a plurality of merchant websites to determine the average price of the product, and then determine whether any of the merchant websites are offering the product for a price that is 50% below that average price. In an embodiment, the contingent payment system provider device may continue to monitor the merchant websites for a predetermined time period (e.g., 4 weeks) to determine whether the product is being offered by a merchant for a price that is 50% below the average price of the product across a plurality of merchant websites. Furthermore, the contingent payment system provider device may also monitor the posting of the contingent payment intent responses on the user profile web page, discussed above, to determine whether any of them allow the purchase of the product at a price that is below 50% of the average price of the product. Thus, at block 106 of the method 100, the contingent payment system provider device may determine that the contingent payment factors for the contingent payment request have been satisfied by determining that the New York Giants have won the Super Bowl and either a merchant website is offering the product for a price that is 50% below the average price of the product, or a friend user has provided a coupon on the user profile of the user that reduces the price of the product to 50% of the current average price.

Furthermore, in this example, the user may have provided an additional contingent payment factor that instructs the contingent payment system provider device to purchase a second product (e.g., a hat) in the event that the first product is purchased. Thus, at block 106 of the method 100, in determining that the contingent payment factors for the contingent payment request for the first product (e.g., the shirt) have been satisfied, the contingent payment system provider device may then determine that the contingent payment factors for the second product (e.g., the hat) have been satisfied as well.

In other examples, the user may provide the contingent payment request with a variety of different contingent payment factors such as, for example, contingent payment factors that prevent the purchase before a desired date (e.g., using the contingent factor detail 306a). Furthermore, the user may provide the contingent payment request with a variety of preferences such as, for example, a restriction to only accept contingent payment intent responses from a subset of user friends of the user.

Furthermore, the contingent payment system provider device may contact the user that provided the contingent payment request in the event that a contingent payment intent response is within a threshold amount of a contingent payment factor. For example, if a user provides a contingent payment request with a contingent payment factor that a product be purchased if the price is below $100, and a user friend posts a contingent payment intent response that includes a coupon that allows the purchase of the product for $105, the contingent payment system provider device may inform the user of the coupon and ask whether the user would like to purchase the product for the price that is slightly above the price designated in their contingent payment request factor. If the user responds with an instruction to purchase the product for that price (e.g., $105 instead of the requested $100), the contingent payment system provider device will determine that the contingent payment factor has been satisfied. In addition, the contingent payment system provider device may contact the user that provided the contingent payment request in the event that a contingent payment request has not been satisfied in a predetermined amount of time. For example, if a contingent payment request has not been satisfied within a month, the contingent payment system provider device may contact the user that provided the contingent payment request to determine whether that user would like to proceed with purchasing the product at a current price, cancel the contingent payment request, or continue with the contingent payment request.

While a plurality of examples have been provided describing specific contingent payment requests and how those contingent payment requests may be satisfied, one of skill in the art will recognize that a variety of different contingent payments requests and methods for satisfying those contingent payment requests and determining whether they have been satisfied will fall within the scope of the present disclosure. In some embodiments, contingent payment requests may be set up to reoccur or exist indefinitely. For example, a user may set up a contingent payment request to occur during predetermined time periods (e.g., seasonally), until cancelled by the user, every month for one week, etc. Furthermore, such contingent payment requests may reoccur even if a previous contingent payment request was satisfied (e.g., a user may be on the lookout for deals for a particular item, and may set up a contingent payment request to purchase that item whenever it is available at a predetermined price.)

The method 100 then proceeds to block 108 where funds are transferred from the user to the merchant to make the purchase associated with the contingent payment request. In an embodiment, in response to determining that the contingent payment factors associated with the contingent payment request have been satisfied, the contingent payment system provider device will cause funds to be automatically from a user account (e.g., without any interaction with the user other than the provision of the contingent payment request) associated with the user that provided the contingent payment request to a merchant account of the merchant that is selling the product that satisfied at least one of the contingent payment factors in the contingent payment request (e.g., at a price that is below an amount specified in a contingent payment factor). In some embodiments, the contingent payment system is provided by the merchant, and the merchant device may use user account information provided by the user (e.g., during the provision of the contingent payment request) to contact an account provider device over a network and have funds transferred from the user account to a merchant account. In some embodiments, the contingent payment system is provided by the payment service provider, and the payment service provider device provides user account information provided by the user (e.g., in setting up an account provided by the payment service provider) to contact an account provider device over a network and have funds transferred from the user account to a merchant account. In some embodiments, the contingent payment system is provided by the account provider, and the account provider device transfers funds from the user account provided by the account provider to a merchant account.

The method 100 then proceeds to block 110 where the user that provided the contingent payment request is associated with at least one other user based on the satisfied contingency. In an embodiment, the contingent payment request may have been satisfied by the provision of a contingent payment intent response by a friend user of the user that provided the contingent payment request. In such an embodiment, the friend user and the user that provided the contingent payment request are then associated with each other in a database by the contingent payment system provider device. By associating users based on satisfied contingent payment requests, the contingent payment system device may build a database of users that are more likely to satisfy contingent payment requests for each other (e.g., relative to users than have never or rarely satisfy each others contingent payment requests). The contingent payment system provider may then solicit coupons from merchants and distribute those coupons to users based on their associations with other users and their previous willingness to satisfy contingent payment requests. While a few examples of the use of the association of users that satisfy contingent payment requests with other users have been provided, one of skill in the art will recognize that a variety of benefits may be realized by associating users with other users based on the satisfaction of contingent payment requests.

Thus, a system and method for providing contingent payments has been described that allows a user to provide a request to purchase a product based on one or more contingencies. When a contingent payment system provider device determines that the contingencies have been satisfied, the product is then automatically purchased. In some embodiments, users other than the user that provided the request may provide coupons for the product that satisfy the contingencies such that the product is purchased for the user. Users that provide such coupons may then be linked with the users whose requests were satisfied by those coupons in order to build a user association database that provides a group of product purchasing users to whom coupons and/or other deals may be forwarded from merchants.

Figure 9:
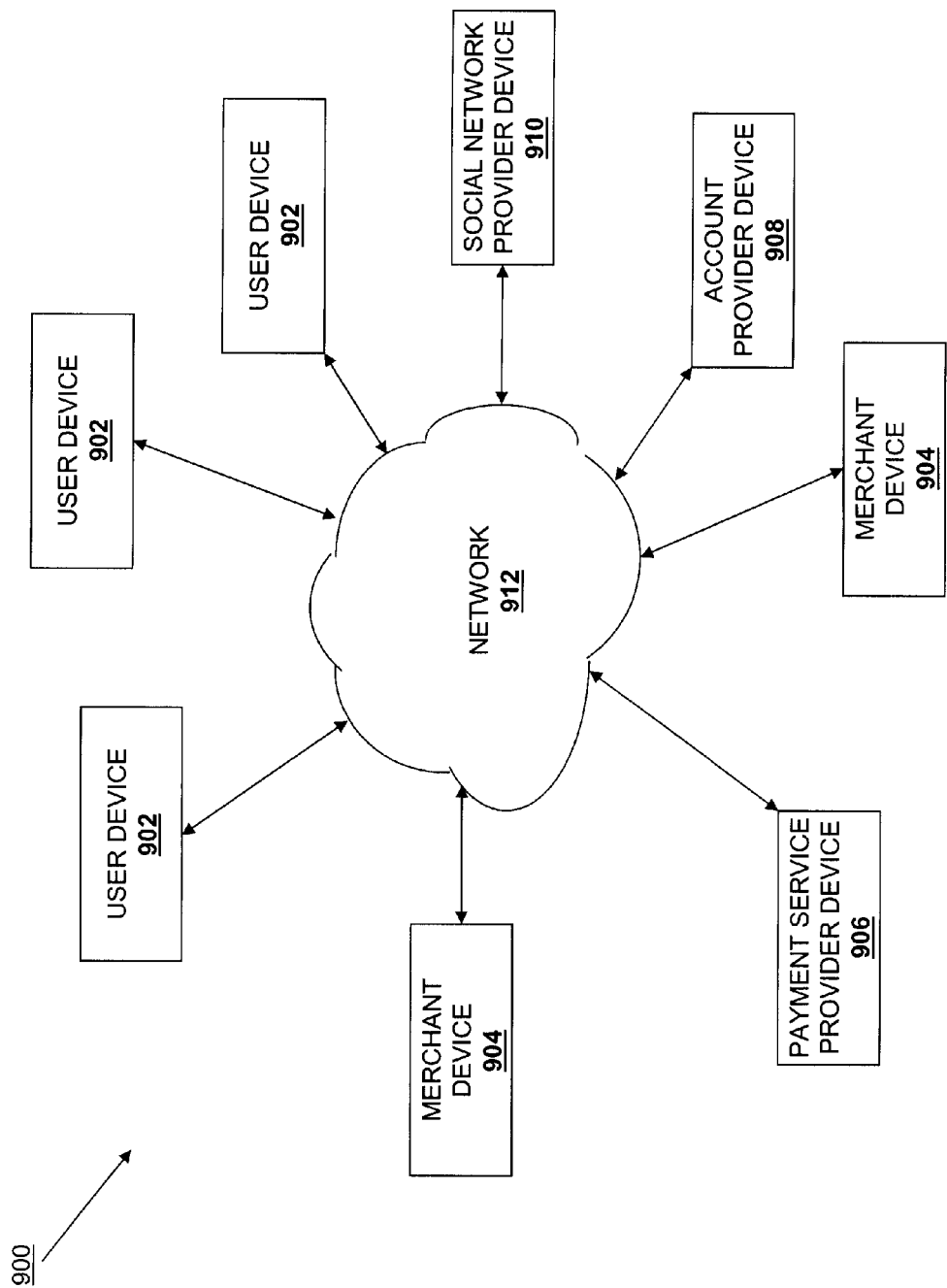
FIG. 9 is a schematic view illustrating an embodiment of a networked system.

Referring now to FIG. 9, an embodiment of a networked system 900 used in the contingent payment system described above is illustrated. The networked system 900 includes a plurality of user devices 902, a plurality of merchant devices 904, a payment service provider device 906, an account holder device 908, and a social network provider device 910 in communication over a network 912. Any of the user devices 902 may be the user device, discussed above. The merchant devices 904 may be the merchant devices discussed above and may be operated by the merchants discussed above. The payment service provider device 906 may be the payment service provider devices discussed above and may be operated by a payment service provider such as, for example, PayPal Inc. of San Jose, Calif. The account provider device 908 may be the account provider devices discussed above and may be operated by the account providers discussed above such as, for example, credit card account providers, bank account providers, savings account providers, and a variety of other account providers known in the art. The social network provider device 910 may be the social network provider device discussed above and may be operated by the social network provider discussed above.

The user devices 902, merchant devices 904, payment service provider device 906, account provider device 908, and social network provider device 910 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 900, and/or accessible over the network 912.

The network 912 may be implemented as a single network or a combination of multiple networks. For example, in various embodiments, the network 912 may include the Internet and/or one or more intranets, landline networks, wireless networks, and/or other appropriate types of networks.

The user device 902 may be implemented using any appropriate combination of hardware and/or software configured for wired and/or wireless communication over network 912. For example, in one embodiment, the user device 902 may be implemented as a personal computer of a user in communication with the Internet. In other embodiments, the user device 902 may be a smart phone, personal digital assistant (PDA), laptop computer, and/or other types of computing devices.

The user device 902 may include one or more browser applications which may be used, for example, to provide a convenient interface to permit the payer to browse information available over the network 912. For example, in one embodiment, the browser application may be implemented as a web browser configured to view information available over the Internet.

The user device 902 may also include one or more toolbar applications which may be used, for example, to provide user-side processing for performing desired tasks in response to operations selected by the payer. In one embodiment, the toolbar application may display a user interface in connection with the browser application.

The user device 902 may further include other applications as may be desired in particular embodiments to provide desired features to the user device 902. In particular, the other applications may include a payment application for payments assisted by a payment service provider through the payment service provider device 906. The other applications may also include security applications for implementing user-side security features, programmatic user applications for interfacing with appropriate application programming interfaces (APIs) over the network 912, or other types of applications. Email and/or text applications may also be included, which allow the payer to send and receive emails and/or text messages through the network 912. The user device 902 includes one or more user and/or device identifiers which may be implemented, for example, as operating system registry entries, cookies associated with the browser application, identifiers associated with hardware of the user device 902, or other appropriate identifiers, such as a phone number. In one embodiment, the user identifier may be used by the merchant device 904, the payment service provider device 906 and/or account provider device 908 to associate the user with a particular account as further described herein.

The merchant device 904 may be maintained, for example, by a conventional or on-line merchant, conventional or digital goods seller, individual seller, and/or application developer offering various products and/or services in exchange for payment to be received conventionally or over the network 912. In this regard, the merchant device 904 may include a database identifying available products and/or services (e.g., collectively referred to as items) which may be made available for viewing and purchase by the payer.

The merchant device 904 also includes a checkout application which may be configured to facilitate the purchase by the payer of items. The checkout application may be configured to accept payment information from the user through the user device 902, the account provider through the account provider device 908, and/or from the payment service provider through the payment service provider device 906 over the network 912.

Figure 10:
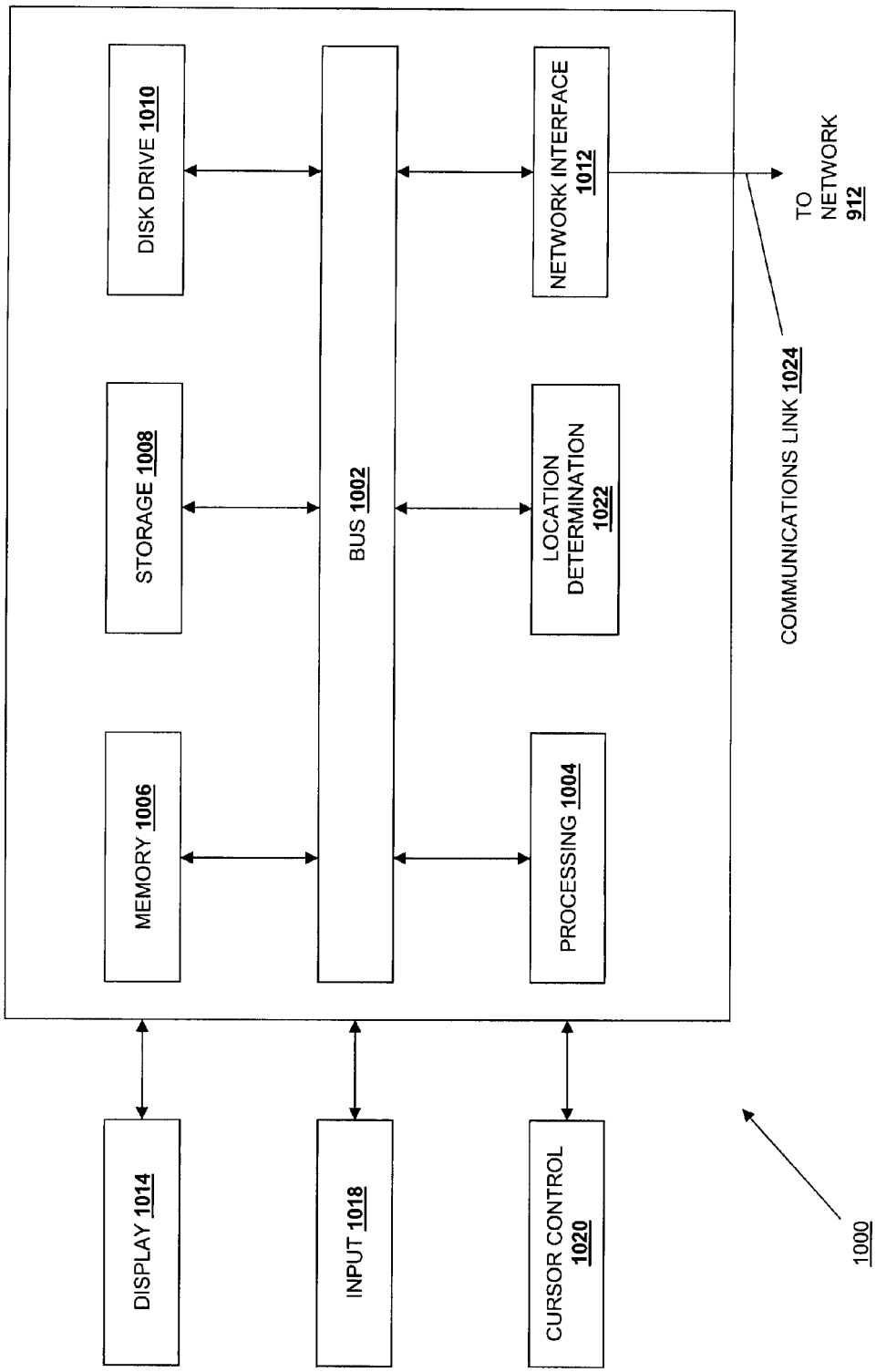
FIG. 10 is a schematic view illustrating an embodiment of a computer system.

Referring now to FIG. 10, an embodiment of a computer system 1000 suitable for implementing, for example, the user device 902, the merchant device 904, the payment service provider device 906, the account provider device 908, and/or the social network provider device 910 is illustrated. It should be appreciated that other devices utilized by users, merchants, payment service providers, account providers, and social network providers in the payment system discussed above may be implemented as the computer system 1000 in a manner as follows.

In accordance with various embodiments of the present disclosure, computer system 1000, such as a computer and/or a network server, includes a bus 1002 or other communication mechanism for communicating information, which interconnects subsystems and components, such as a processing component 1004 (e.g., processor, micro-controller, digital signal processor (DSP), etc.), a system memory component 1006 (e.g., RAM), a static storage component 1008 (e.g., ROM), a disk drive component 1010 (e.g., magnetic or optical), a network interface component 1012 (e.g., modem or Ethernet card), a display component 1014 (e.g., CRT or LCD), an input component 1018 (e.g., keyboard, keypad, or virtual keyboard), a cursor control component 1020 (e.g., mouse, pointer, or trackball), and/or a location determination component 1022 (e.g., a Global Positioning System (GPS) device as illustrated, a cell tower triangulation device, and/or a variety of other location determination devices known in the art.) In one implementation, the disk drive component 810 may comprise a database having one or more disk drive components.

In accordance with embodiments of the present disclosure, the computer system 1000 performs specific operations by the processor 1004 executing one or more sequences of instructions contained in the memory component 1006, such as described herein with respect to the user device 902, the merchant device(s) 904, the payment service provider device 906, the account provider device(s) 908, and/or the social network provider device 910. Such instructions may be read into the system memory component 1006 from another computer readable medium, such as the static storage component 1008 or the disk drive component 1010. In other embodiments, hard-wired circuitry may be used in place of or in combination with software instructions to implement the present disclosure.

Logic may be encoded in a computer readable medium, which may refer to any medium that participates in providing instructions to the processor 1004 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1010, volatile media includes dynamic memory, such as the system memory component 1006, and transmission media includes coaxial cables, copper wire, and fiber optics, including wires that comprise the bus 1002. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 2000. In various other embodiments of the present disclosure, a plurality of the computer systems 1000 coupled by a communication link 1024 to the network 912 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1000 may transmit and receive messages, data, information and instructions, including one or more programs (i.e., application code) through the communication link 1024 and the network interface component 2012. The network interface component 1012 may include an antenna, either separate or integrated, to enable transmission and reception via the communication link 1024. Received program code may be executed by processor 1004 as received and/or stored in disk drive component 1010 or some other non-volatile storage component for execution.

Figure 11:
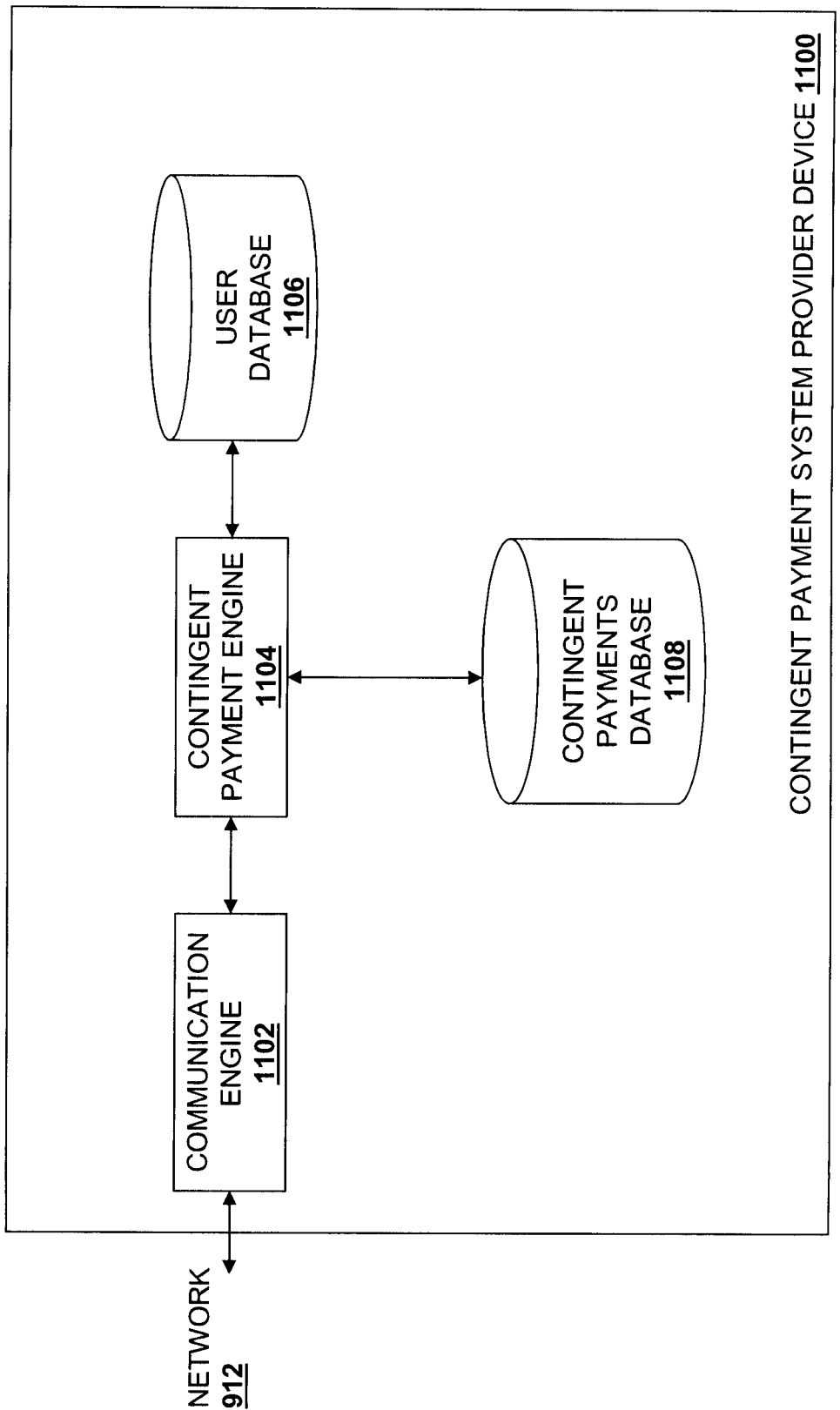
FIG. 11 is a schematic view illustrating an embodiment of a contingent payment system provider device.

Referring now to FIG. 11, an embodiment of a contingent payment system provider device 1100 is illustrated. In an embodiment, the device 1100 may be the merchant device 904, the payment service provider device 906 and/or the account holder device 908. The device 1100 includes a communication engine 1102 that is coupled to the network 912 and to an contingent payment engine 1104 that is coupled to a user database 1106 and a contingent payments database 1108. The communication engine 1102 may be software or instructions stored on a computer-readable medium that allows the device 1100 to send and receive information over the network 912. The contingent payment engine 1104 may be software or instructions stored on a computer-readable medium that is operable to receive contingent payment requests, store them and associate them with users in the databases 1106 and 1108, monitor for the satisfaction of contingent payment requests, initiate and/or complete the transfer of funds from user accounts to merchant accounts, associate users based on satisfied contingent payment request, and/or provide any of the other functionality that is discussed above. While the databases 1106 and 1108 has been illustrated as located in the contingent payment system provider device 1100, one of skill in the art will recognize that they may be connected to the contingent payment engine 1104 through the network 912 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on users and merchants; however, a user or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a user. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for providing contingent payments, comprising:
   receiving, by a system provider device from a first user through a user device over a network, a contingent payment request that identifies a single product and includes at least one contingent payment factor that identifies a desired price below which the single product should be purchased;
   storing the contingent payment request in a database using the system provider device;
   providing, using the system provider device, a contingent payment intent that identifies the single product and includes the at least one contingent payment factor for display on a user profile of a social network that is associated with the first user, wherein the providing the contingent payment intent for display on the user profile results in the contingent payment intent being displayed to a plurality of other users of the social network;
   monitoring the user profile by the system provider device and, in response, determining by the system provider device that the at least one contingent payment factor in the contingent payment request has been satisfied by a second user of the plurality of other users of the social network providing a contingent payment intent response that is displayed on the user profile and that provides a coupon that allows for the purchase of the single product below the desired price; and
   transferring funds from a user account associated with the first user to a merchant account by the system provider device in order to purchase the single product according to the coupon in response to determining by the system provider device that the at least one contingent payment factor has been satisfied by the contingent payment intent response provided by second user on the user profile.

2. The method of claim 1, wherein the contingent payment request includes a plurality of contingent payment factors, and the transferring funds from the user account associated with the first user to the merchant account by the system provider device in order to purchase the single product that is associated with the contingent payment request is performed in response to determining by the system provider device that all of the plurality of contingent payment factors have been satisfied.

3. The method of claim 1, further comprising:
receiving a restriction that restricts contingent payment intent responses to only the plurality of other users of the social network, wherein the plurality of other users in the social network are a subset of the users of the social network that have users profiles that are associated with the user profile of the first user.

4. The method of claim 3, further comprising:
associating the second user with the first user by the system provider device in response to determining by the system provider device that the second user provided the coupon in response to the contingent payment request.

5. The method of claim 1, further comprising:
determining by the system provider device that at least one contingent payment factor in the contingent payment request has been satisfied in response to determining by the system provider device that a predetermined event has occurred.

6. The method of claim 5, wherein the predetermined event includes a date.

7. The method of claim 1, further comprising.
completing by the system provider device the purchase of a second product that is associated with the contingent payment request in response to purchasing the single product.

8. The method of claim 1, wherein the user profile is provided by a social network provider device, the providing the contingent payment intent for display on the user profile of the social network by the system provider device includes providing by the system provider device the contingent payment request to the social network provider device over the network, and the monitoring the user profile by the system provider device includes monitoring the user profile by the system provider device over the network through the social network provider device.

9. A non-transitory machine-readable medium comprising a plurality of machine-readable instructions which, when executed by one or more processors, are adapted to cause the one or more processors to perform a method comprising:
receiving, from a first user through a user device over a network, a contingent payment request that identifies a single product and includes at least one contingent payment factor that identifies a desired price below which the single product should be purchased;
storing the contingent payment request in a database;
providing a contingent payment intent that identifies the single product and includes the at least one contingent payment factor for display on a user profile of a social network that is associated with the first user, wherein the providing the contingent payment intent for display on the user profile results in the contingent payment intent being displayed to a plurality of other users of the social network;
monitoring the user profile and, in response, determining that the at least one contingent payment factor in the contingent payment request has been satisfied by a second user of the plurality of other users of the social network providing a contingent payment intent response that is displayed on the user profile and that provides a coupon that allows for the purchase of the single product below the desired price; and
transferring funds from a user account associated with the first user to a merchant account in order to purchase the single product according to the coupon in response to determining that the at least one contingent payment factor has been satisfied by the contingent payment intent response provided by the second user on the user profile.

10. The non-transitory machine-readable medium of claim 9, wherein the contingent payment request includes a plurality of contingent payment factors, and the transferring funds from the user account associated with the first user to the merchant account in order to purchase the single product that is associated with the contingent payment request is performed in response to determining that all of the plurality of contingent payment factors have been satisfied.

11. The non-transitory machine-readable medium of claim 9, wherein the method further comprises:
receiving a restriction that restricts contingent payment intent responses to only the plurality of other users of the social network, wherein the plurality of other users in the social network are a subset of the users of the social network that have users profiles that are associated with the user profile of the first user.

12. The non-transitory machine-readable medium of claim 11, wherein the method further comprises:
associating the second user with the first user in response to determining that the second user provided the coupon in response to the contingent payment request.

13. The non-transitory machine-readable medium of claim 9, further comprising:
determining that at least one contingent payment factor in the contingent payment request has been satisfied in response to determining that a predetermined event has occurred.

14. The non-transitory machine-readable medium of claim 13, wherein the predetermined event includes a date.

15. The non-transitory machine-readable medium of claim 9, wherein the method includes:
completing the purchase of a second product that is associated with the contingent payment request in response to purchasing the single product.

16. The non-transitory machine-readable medium of claim 9, wherein the user profile is provided by a social network provider device, the providing the contingent payment intent for display on the user profile of the social network includes providing the contingent payment request to the social network provider device over the network, and the monitoring the user profile includes monitoring the user profile over the network through the social network provider device.

17. A online payment system, comprising:
means for receiving a contingent payment request that identifies a single product and includes at least one contingent payment factor that identifies a desired price below which the single product should be purchased;
means for storing the contingent payment request;
means for providing a contingent payment intent that identifies the single product and includes the at least one contingent payment factor for display on a user profile of a social network that is associated with the first user, wherein the providing the contingent payment intent for display on the user profile results in the contingent payment intent being displayed to a plurality of other users of the social network;
means for monitoring the user profile and, in response, determining that the at least one contingent payment factor in the contingent payment request has been satisfied by a second user of the plurality of other users of the social network providing a contingent payment intent response that is displayed on the user profile and that provides a coupon that allows for the purchase of the single product below the desired price; and means for transferring funds from the first user to a merchant in order to purchase the single product according to the coupon in response to determining that the at least one contingent payment factor has been satisfied by the contingent payment intent response provided by the second user on the user profile.

18. The system of claim 17, further comprising:

means for receiving a restriction that restricts contingent payment intent responses to only the plurality of other users of the social network, wherein the plurality of other users in the social network are a subset of the users of the social network that have users profiles that are associated with the user profile of the first user.

19. The system of claim 18, further comprising:

means for associating the second user with the first user in response to determining that the second user provided the coupon in response to the contingent payment request.

20. The system of claim 17, further comprising:

means for completing the purchase of a second product that is associated with the contingent payment request in response to purchasing the single product.

* * * * *